(12) United States Patent
Whitfield, Jr. et al.

(10) Patent No.: US 11,242,067 B2
(45) Date of Patent: Feb. 8, 2022

(54) INTERLOCK SYSTEM FOR AUTONOMOUS VEHICLE

(71) Applicant: LIEBHERR MINING EQUIPMENT NEWPORT NEWS CO., Newport News, VA (US)

(72) Inventors: James Whitfield, Jr., Newport News, VA (US); Bryan Harper, Newport News, VA (US)

(73) Assignee: LIEBHERR MINING EQUIPMENT NEWPORT NEWS CO., Newport News, VA (US)

( * ) Notice: Subject to any disclaimer, the term of this patent is extended or adjusted under 35 U.S.C. 154(b) by 127 days.

(21) Appl. No.: 16/412,128

(22) Filed: May 14, 2019

(65) Prior Publication Data

US 2020/0361481 A1 Nov. 19, 2020

(51) Int. Cl.
*B60W 50/08* (2020.01)
*G05D 1/00* (2006.01)

(52) U.S. Cl.
CPC ......... *B60W 50/082* (2013.01); *G05D 1/0061* (2013.01); *G05D 2201/0213* (2013.01)

(58) Field of Classification Search
CPC ........... B60W 50/082; B60W 2300/17; B60W 2540/215; B60W 60/005; G05D 1/0061; G05D 2201/0213; B60K 28/00
See application file for complete search history.

(56) References Cited

U.S. PATENT DOCUMENTS

| 7,337,865 B2 | 3/2008 | Cook et al. | |
| 2014/0168827 A1* | 6/2014 | Mirzaei | H02H 3/253 |
| | | | 361/31 |

FOREIGN PATENT DOCUMENTS

| RU | 2684822 C2 * | 4/2019 | ............. B60L 50/13 |
| WO | 2014148976 A1 | 9/2014 | |
| WO | 2015037442 A1 | 3/2015 | |
| WO | 2015187081 A1 | 12/2015 | |
| WO | 2016046979 A1 | 3/2016 | |
| WO | 2016047208 A1 | 3/2016 | |
| WO | 2017184068 A1 | 10/2017 | |

* cited by examiner

*Primary Examiner* — Brian P Sweeney
(74) *Attorney, Agent, or Firm* — McCoy Russell LLP

(57) ABSTRACT

The present application relates to a vehicle comprising a vehicle control system, the vehicle control system being configured to operate the vehicle in an autonomous mode and in a manual mode, the vehicle control system comprising: a first selector switch for switching between said autonomous mode and said manual mode; a second selector switch for switching between said autonomous mode and said manual mode; and an interlock circuit configured to deactivate propulsion of the machine when the first and the second selector switch are switched to different modes.

22 Claims, 4 Drawing Sheets

FIG. 4

S1: operating the vehicle in manual mode with a first switch switched to manual mode and a second switch switched to manual mode S2: switching the first switch from manual mode to autonomous mode S2.1: leaving the cabin S3: switching the second switch from manual mode to autonomous mode

FIG. 5

S4: operating the vehicle in manual mode with a first switch switched to manual mode and a second switch switched to manual mode S5: switching the first switch from manual mode to autonomous mode, thereby activating a first stage of an interlock circuit deactivating propulsion of the machine S6: activating a second stage of the interlock circuit with a remote control S7: leaving the cabin S8: switching the second switch from manual mode to autonomous mode, thereby deactivating the first stage of the interlock circuit S9: moving away from the vehicle S10: activating propulsion of the machine by deactivating the second stage of the interlock circuit with a remote control

INTERLOCK SYSTEM FOR AUTONOMOUS VEHICLE

FIELD

In a first aspect, the present application relates to a vehicle comprising a vehicle control system, the vehicle control system being configured to operate the vehicle in an autonomous mode and in a manual mode.

In a second aspect, the present application further relates to a vehicle comprising an internal combustion engine, an alternator driven by the combustion engine for generating electrical energy, the alternator comprising an exciter, and an electrical drive powered by the electrical energy generated by the alternator, the electrical drive configured to propel the vehicle.

In a third aspect, the present application relates a method for transitioning between a manual mode and an autonomous mode for controlling a vehicle.

BACKGROUND

Vehicles, such as dumper trucks, may have an autonomous mode where the vehicle control system autonomously controls the vehicle, and a manual mode, where the vehicle is controlled by a driver. The driver may sit in a cab of the vehicle for controlling the vehicle in manual mode. The vehicle may transition from manual mode to autonomous mode.

Propulsion of a vehicle, such as a dumper truck, may be provided by an electrical drive powered by an internal combustion engine driving an alternator. Such a propulsion system is sometimes referred to as diesel-electric. Diesel-electric vehicles may be provided with an emergency stop that allows a driver to deactivate propulsion of the vehicle.

SUMMARY

An object of the present application is to provide functionality and method for transitioning between a manual mode and an autonomous mode of a vehicle. A further object of the present application is to provide functionality and method for safeguarding a driver when the driver is approaching the vehicle to operate it in manual mode or stepping away from the vehicle such that the vehicle may be operated in autonomous mode.

A further object of the present application is to provide an interlock circuit functionality for vehicles having a diesel-electric propulsion.

These and other objects may be solved by embodiments of the present disclosure.

The present application comprises concepts for transitioning between a manual mode and an autonomous mode of a vehicle using two hardware selector switches.

The present application comprises a concept of a circuit that includes relays to disconnect the supply voltage from the traction alternator excitation device.

The present application comprises a concept of incorporating an interlock circuit trigger to the circuit that disconnects the supply voltage from the traction alternator excitation device.

The present application comprises a concept of using mode selector switches to detect that a person is engaged in the transition to/from manned to autonomous operation and triggering the excitation disconnect circuit.

In a first embodiment, a vehicle is provided, the vehicle comprising a vehicle control system, the vehicle control system being configured to operate the vehicle in an autonomous mode and in a manual mode, the vehicle control system comprising: a first selector switch for switching between said autonomous mode and said manual mode; a second selector switch for switching between said autonomous mode and said manual mode; and an interlock circuit configured to deactivate propulsion of the machine when the first and the second selector switch are switched to different modes.

In an embodiment, the first and second switches may be spatially separated such that a single operator cannot access both at the same time. In an embodiment, the location of the first and second switches may be such that one is at ground level and the other one is on cab level.

In a second embodiment, a vehicle is provided, the vehicle comprising: an internal combustion engine, an alternator driven by the combustion engine for generating electrical energy, the alternator comprising an exciter, an electrical drive powered by the electrical energy generated by the alternator, the electrical drive configured to propel the vehicle, and a safety system comprising an interlock circuit, the interlock circuit being configured to cut off power to the exciter.

In a third embodiment, a method for transitioning between a manual mode and an autonomous mode for controlling a vehicle is provided, the method comprising: operating the vehicle in manual mode with a first selector switch switched to manual mode and a second selector switch switched to manual mode; switching the first selector switch from manual mode to autonomous mode; switching the second selector switch from manual mode to autonomous mode, wherein propulsion of the machine is deactivated by an interlock circuit during a transitioning period in which the first selector switch is switched to autonomous mode and the second selector switch is switched to manual mode.

BRIEF DESCRIPTION OF THE DRAWINGS

FIG. 4 is a schematic drawing showing steps of a first embodiment of a method for transitioning between an manual mode and an autonomous mode and FIG. 5 is a schematic drawing showing steps of a second embodiment of a method for transitioning between an manual mode and an autonomous mode.

DETAILED DESCRIPTION

Figure 1:
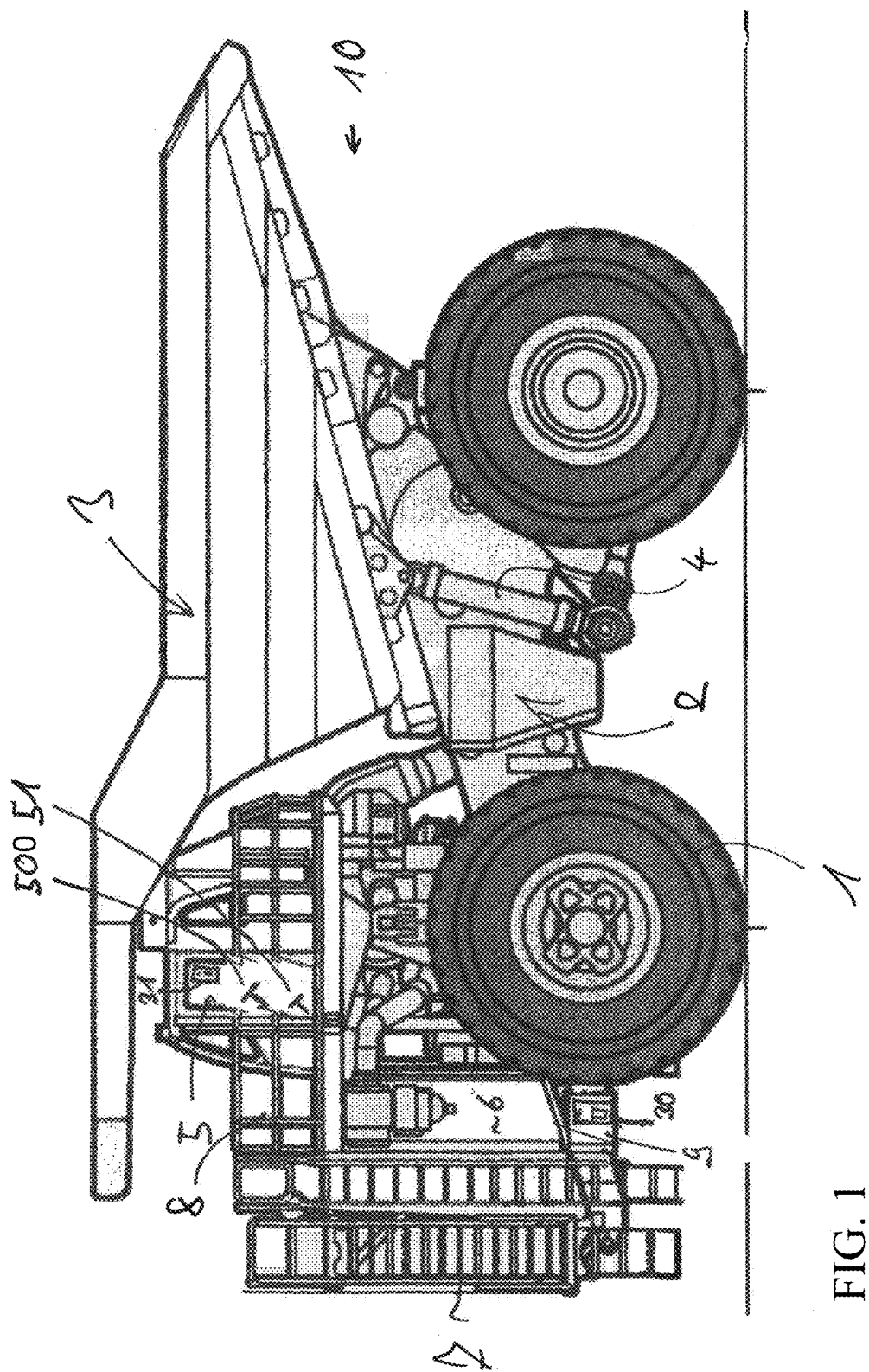
FIG. 1 is a side view of a an embodiment of a vehicle.

FIG. 1 shows an exemplary embodiment of a vehicle of vehicle 10 as a dumper truck used in mines for transport purposes. The dumper truck may have a payload of 100 metric tons or more. Concepts of the present disclosure can equally be applied to other types of vehicles.

The dumper truck comprises a chassis 2 that is movable on wheels 1. The wheels 1 are driven by a drive unit 6 comprising at least one engine. The engine may be an internal combustion engine, e. g. a diesel engine. In an embodiment, the drive unit 6 may be a diesel-electric drive unit. The wheels may be driven by electric motors powered by a generator, the generator in turn driven by the diesel engine.

The dumper truck shown in FIG. 1 comprises a dump body 3 mounted on the chassis 2. The dump body is attached to the chassis with a horizontal pivot axis, and can be swiveled up by hoist cylinders 4 in order to let material contained in the dump body slide out of the dump body to the rear side of the dumper truck.

Figure 2:
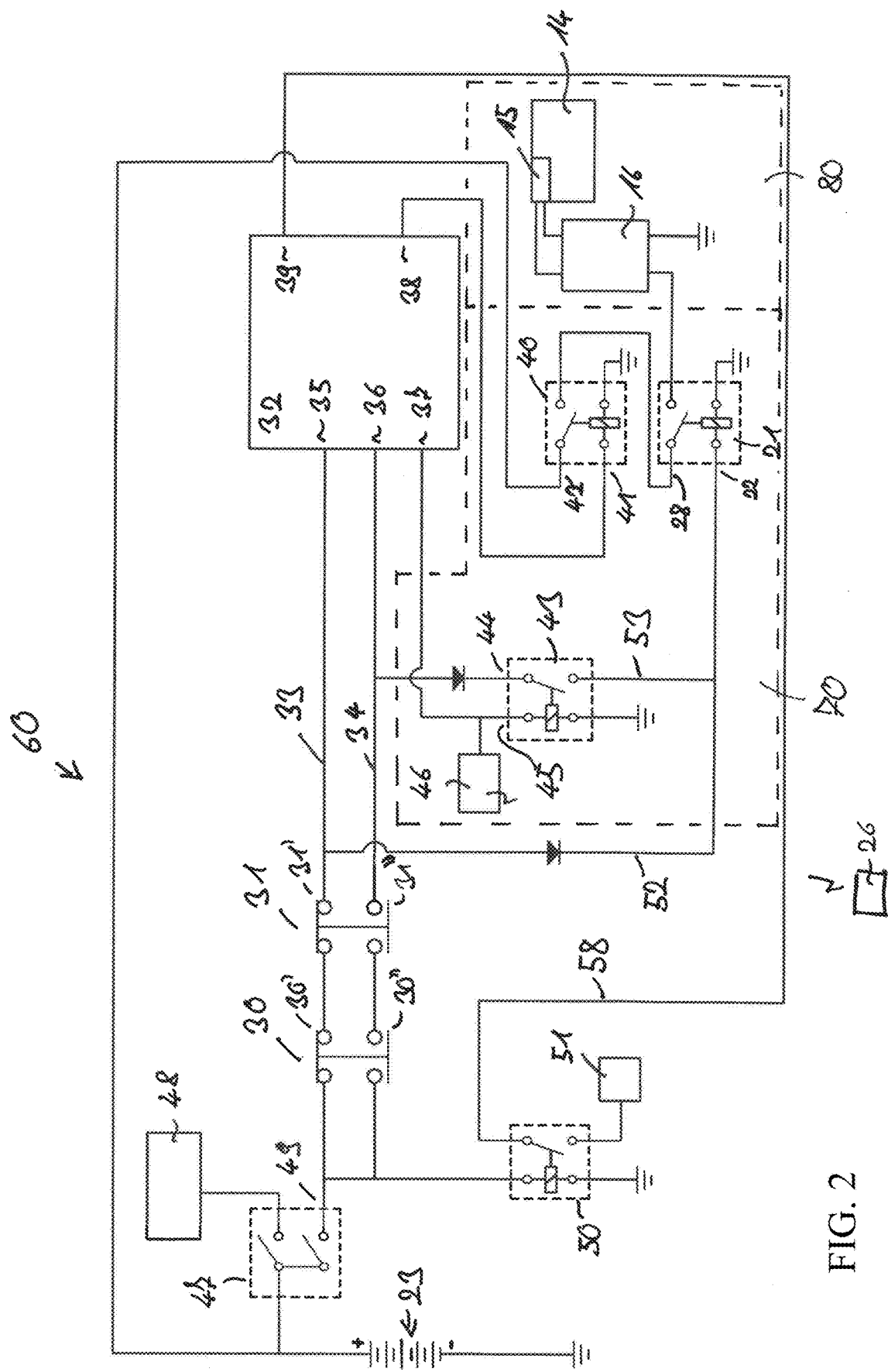
FIG. 2 is a schematic drawing showing an exemplary diagram of an embodiment of a vehicle control system.

The dumper truck further comprises a vehicle control system 60 for controlling the vehicle. A first embodiment of a vehicle control system 60 is shown in FIG. 2.

In the first embodiment, the vehicle control system is configured to operate the vehicle in an autonomous mode and in a manual mode. The vehicle control system comprises a first selector switch 30 for switching between said autonomous mode and said manual mode, a second selector switch 31 for switching between said autonomous mode and said manual mode and an interlock circuit 70 configured to deactivate propulsion of the machine when the first selector switch 30 and the second selector switch 31 are switched to different modes. This functionality may provide a first stage of the interlock circuit activated and deactivated by the first and second selector switches.

In autonomous mode, the vehicle control system may use a predefined trajectory to autonomously move the vehicle from a start position to an end position. The vehicle control system may identify the current position of the vehicle and may autonomously control the vehicle along the predefined trajectory.

In manual mode, the vehicle is controlled by a driver using input elements arranged on the vehicle.

As shown in FIG. 1, in an embodiment, the vehicle may comprise a cabin 5 for a driver, in order to allow manual operation of the vehicle. The cabin may be provided with input elements for controlling the vehicle in the manual mode. For example, a steering wheel 500 and an accelerator pedal 51 may be provided in the cabin for controlling a steering angle and a speed of the vehicle.

In such a configuration, the first selector switch 30 may be located in the cabin 5 and the second selector switch 31 may be located outside the cabin 5 on the vehicle.

In an embodiment, the second selector switch 31 may be located in an area of the vehicle accessible by a person standing next to the vehicle on the ground but not accessible from the cabin 5. In the embodiment shown in FIG. 1, the second selector switch 31 is arranged on a bumper of the vehicle.

As shown in FIG. 1, in an embodiment, the vehicle may comprise stairs 7 for climbing up to the cabin. In the embodiment, the cabin 5 is provided on a platform 8 accessible via the stairs 7.

In such a configuration, the first selector switch 30 may be located in a first area that is accessible by climbing the stairs 7 and the second selector switch 31 may be located in a second area accessible by descending the stairs 7. Instead or in addition to the stairs 7, a ladder may be provided for climbing up to the cabin.

The vehicle control system may comprise a controller 32 providing drive by wire functionality. The controller may control a braking system, a steering system and a propulsion system of the vehicle. The controller may comprise a microcontroller running a software for controlling the vehicle. The software may be stored on non-transitory memory.

When switched to manual mode, the controller will control the vehicle on the basis of commands provided by the input elements 500, 51. When switched to autonomous mode, the controller will control the vehicle on the basis of commands provided by an autonomy system.

The first selector switch 30 and the second selector switch 31 may be configured as hardware witches. In an embodiment, the first selector switch 30 and the second selector switch 31 may be configured such that they can be manually switched from a first position to a second position and back. If both switches are in the first position, the controller is switched to manual mode. If both switches are switched to the second position, the controller is switched to autonomous mode.

If the two switches are in different positions, the controller may be configured to control the vehicle such that the vehicle does not move. As a safety feature, in addition, if the two switches are in different positions, propulsion of the vehicle is deactivated.

The controller 32 may be provided with a first input 35 and a second input 36 for switching between autonomous mode and manual mode. If input 35 is powered, the controller 32 may operate in manual mode. If input 36 is powered, the controller 32 may operate in autonomous mode. If neither the first input 35 nor the second input 36 is powered, the controller is configured to control the vehicle such that the vehicle does not move.

In an embodiment, the first and the second selector switch may be arranged in series in electrical lines 33 and 34 connecting the first input 35 and the second input 36 to a power source 23, respectively. The order in which the first and the second selector switch are arranged in lines 33 and 34 may be reversed with respect to the configuration shown in FIG. 2.

The first selector switch 30 may comprise a first selector switchable connection 30' arranged in electrical line 33 and a second selector switchable connection 30" arranged in electrical line 34. The second selector switch 31 may comprise a first selector switchable connection 31' arranged in electrical line 33 and a second selector switchable connection 31" arranged in electrical line 34.

The first selector switch 30 and the second selector switch 31 may each be configured such that in a first position of the respective switch, the first selector switchable connection 30', 31' is closed and the second selector switchable connection 30", 31" is opened (the manual mode position) and such that in a second position of the respective switch, the first selector switchable connection 30', 31' is opened and the second selector switchable connection 30", 31" is closed (the autonomous mode position).

In addition to switching the controller 32 between autonomous mode and manual mode, the first and the second selector switch may deactivate propulsion of the machine when they are in different positions.

In an embodiment, the deactivation of the propulsion of the vehicle is independent from the controller 32.

In an embodiment, the deactivation of the propulsion of the vehicle is provided by hard wiring the selector switches 30 and 31 to the interlock circuit 70 such that the interlock circuit 70 is controlled by the selector switches 30 and 31.

In an embodiment, the interlock circuit 70 may comprise a first relay 21, the first relay 21 being configured to deactivate propulsion of the machine when a control port 22 of the first relay is not powered.

In an embodiment, the first selector switch 30 and the second selector switch 31 are configured to control power to the control port 22 of the first relay 21. The first and the second selector switch 30, 31 may be connected in series to power the control port 22 of the first relay 21 when switched to the same mode, and configured to cut power to the control port 22 of the first relay 21 off when switched to different modes.

In an embodiment, the electrical lines 33 and 34 switched by the first and second selector switch may be connected to the control port 22 of the first relay 21 via electrical lines 52 and 53. The connection may be a parallel connection.

In an embodiment, the interlock circuit may comprise a second relay 40, arranged in series with the first relay 21, such that the first relay 21 and the second relay 40 can deactivate propulsion of the vehicle independently from each other. In an embodiment, the second relay 40 may be controlled by a microprocessor of the controller 32. The controller 32 includes memory and instructions for executing actions such as deactivating propulsion.

The controller may be provided with an output 39 controlling power to a control port 41 of the second relay 40.

In an embodiment, the vehicle control system may comprise a remote control 26 configured to remotely control the interlock circuit 70. This functionality may provide a second stage of the interlock circuit 70. In the embodiment, the remote control 26 is connected by a wireless interface to a receiver 46 of the vehicle control system. The wireless interface may be provided by radio communication.

In an embodiment, remote control 26 may only effective for deactivating propulsion of the vehicle if the vehicle is in autonomous mode.

In an embodiment, the second stage of the interlock circuit 70 may comprise a third relay 43 arranged in a first electrical line 53 powering the control port 22 of the first relay 21, the third 43 relay being controlled by the remote control 26. In particular, receiver 46 may be controlled by the remote control 26 to power a control port 45 of the third relay 43, such that a switchable connection 44 of the third relay arranged the first electrical line 53 is closed.

The first electrical line 53 may connect the control port 22 of the first relay 21 to a power source 23 if the first and the second selector switch 30, 31 are switched to autonomous mode.

The first electrical line 53 may connect the control port 22 of the first relay 21 via relay 43 to line 34. Line 34 may be powered by the first and the second selector switch 30, 31 if they are both switched to autonomous mode.

A further electrical line 52, arranged parallel to the first electrical line 53, may connect the control port 22 of the first relay 21 to line 33. Line 33 may be powered by the first and the second selector switch 30, 31 if they are both switched to manual mode. Thereby, remote control 26 is only effective in autonomous mode in an embodiment.

The controller 37 may have a third input connected to the receiver 46. Thereby, the controller knows the status of the remotely controlled third relay 43.

In an embodiment, the vehicle control system may further comprise a third switch 47 for deactivating propulsion of the vehicle. The third switch 47 may be connected in series with the first and the second selector switch 30, 31 such that the third switch 47 is configured to cut power to the control port 22 of the first relay 21 independently from the first and second selector switch 30, 31.

The third switch 47 may be arranged between the power source 23 and the first selector switch 30. The first selector switch 30 may be connected to a first output terminal of the third switch 47. If the third switch is closed, a connection is provided between the power source 23 and the first selector switch 30.

The third switch 47 may have a further output terminal connected to a feedback element 49. The feedback element 49 may comprise an acoustic or optical signal showing that propulsion of the vehicle is deactivated by the third switch.

In an embodiment, the vehicle may further comprise a park brake 27, wherein the vehicle control system is configured such that the park brake 27 cannot be released if the third switch 47 deactivates propulsion of the vehicle.

The park brake may be released by powering a park brake valve 51. In an embodiment, a relay 50 may be provided in a control line 58 for powering the park brake valve 51. A control port of the relay 50 may be powered if the third switch 47 is closed, thereby establishing a connection between the control line 58 and the park brake valve. The control line 58 is connected to the controller 32, such that the controller 32 may control the park brake valve 51.

In the embodiment shown in FIG. 2, the control port of the relay 50 is connected in parallel to switch 30. In an alternative embodiment, the control port of the relay 50 may be connected in parallel with the control port 22 of the first relay 21.

In an embodiment, a propulsion system 80 of the vehicle may comprise an alternator 14 comprising an exciter 15, wherein the interlock circuit 70 is configured to cut off power to the exciter 15 for deactivating propulsion of the vehicle. By cutting off power to the exciter 15, the alternator will no longer provide electrical energy for the propulsion system of the vehicle.

In an embodiment, the first relay 21 may be configured to cut off power to the exciter 15 when the first and the second selector switch 30, 31 are switched to different modes.

A switchable connection 28 of the first relay 21 may be arranged in an electrical line providing power to a field regulator 16 controlling the exciter 15. If the power to control port 22 of the first relay 21 is cut off, the switchable connection 28 will open, and cut off power to the field regulator 16, such that the exciter 15 will be deactivated. Deactivating the exciter will deactivate the alternator 14.

The switchable connection 42 of the second relay 41 may be arranged in series with the switchable connection 28 of the first relay 21. If the power to control port 22 of the second relay 41 is cut off, the switchable connection 42 will open, and cut off power to the field regulator 16.

In an alternative embodiment, the first and the second relay may be configured to cut off a power connection between an alternator and an electrical drive.

In an alternative embodiment, the first and the second relay may be configured to mechanically disconnect the internal combustion engine from the alternator.

Figure 3:
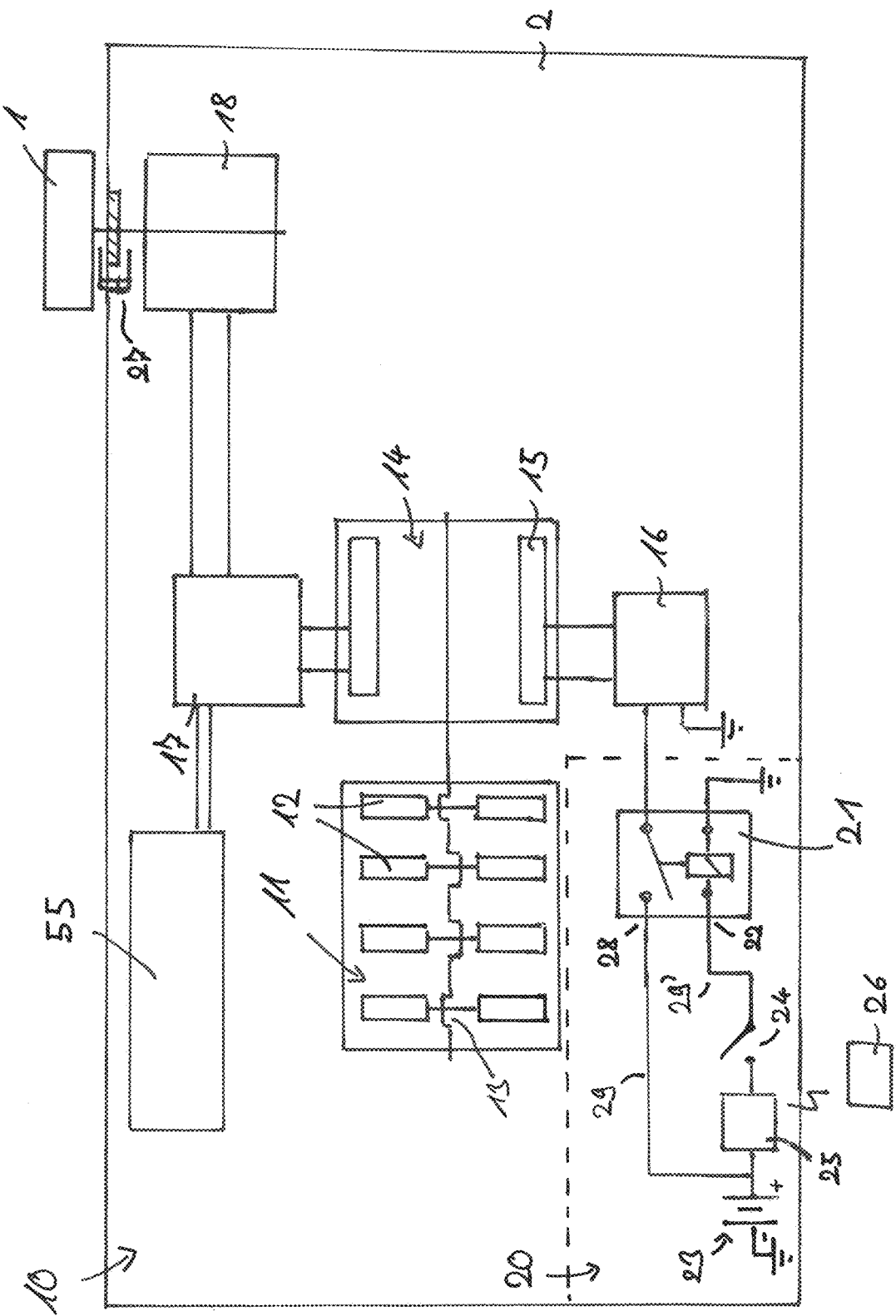
FIG. 3 is a schematic drawing showing components of an embodiment of a vehicle.

FIG. 3 shows a further embodiment of a vehicle 10 having a propulsion system and a safety system.

In an embodiment, the vehicle may comprise an internal combustion engine 11, an alternator 14 driven by the combustion engine 11 for generating electrical energy, the alternator comprising an exciter 15, an electrical drive 18 powered by the electrical energy generated by the alternator 14, the electrical drive 18 configured to propel the vehicle.

The combustion engine 11 may comprise cylinders 12 with reciprocating pistons driving a crank shaft 13. The crank shaft 13 may drive an output shaft of the engine. The engine may be a Diesel engine.

An output shaft of the internal combustion engine 11 may drive a rotor of alternator 14. The exciter 15 of the alternator may be driven by a field regulator 16. If the exciter is powered in this way, the alternator may generate electrical energy out of the mechanical energy provided by internal combustion engine 11. If the exciter is not powered, the alternator may be unable to generate electrical energy.

The vehicle may further comprise a safety system comprising an interlock circuit 20, the interlock circuit 20 being configured to cut off power to the exciter 15.

In an embodiment, the interlock circuit 20 may comprise a first relay 21 arranged in a first electrical line 29 powering the exciter 15, wherein the first relay 21 is configured to cut off power to the exciter 15 if a control port 22 of the first relay 21 is not powered.

The vehicle may comprise a remote control 26 configured to remotely control power to the control port 22 of the first relay 21. A receiver 46 remotely connected to the remote control may be configured to cut off power in a second electrical line 29' powering the control port 22. The remote control therefore may be configured to activate an interlock circuit of the vehicle. The remote control may comprise an interlock circuit button for this purpose.

The vehicle may comprise at least one switch 25 arranged in in a second electrical line 29' powering the control port 22 of the first relay 21, wherein the switch 25 is operable manually to cut off power to the control port 22.

In an embodiment, the vehicle may further comprise an electrical retarder 17 coupled to the electrical drive 18 for operating the electrical drive 18 in a braking mode, the electrical retarder 17 configured to stay connected to the electrical drive 18 when the interlock circuit 20 is activated.

The electric retarder 17 may operate by controlling the electric drive motors 18 of the vehicle to provide a braking torque to the wheels 1. The electric drive 18 motors thereby generate electrical energy, which may be dissipated as heat by a resistor system 55, or may be recovered by an energy storage system.

In an embodiment, the vehicle may further comprise a service brake 27. The safety system may be configured to engage the service brake 27 when the interlock circuit 20 is activated.

The vehicle control systems described in relation to FIG. 2 and FIG. 3 may be combined.

The vehicle control system may further comprise a detection system. The detection system may comprise sensors for detecting a position of the vehicle and surroundings of the vehicle.

The vehicle control system may further comprise a trajectory control system, a braking control system and a steering control system.

The vehicle control system may communicate with a traffic and/or fleet management system.

FIG. 4 shows a first embodiment of a method for transitioning between a manual mode and an autonomous mode for controlling a vehicle. The method may comprise the following steps:

In step S1, the vehicle may be operated in manual mode. A first selector switch may be switched to manual mode and a second selector switch may be switched to manual mode.

In step S2, the first selector switch may be switched from manual mode to autonomous mode.

In step S3, the second selector switch may be switched from manual mode to autonomous mode.

The switches may be used to switch a controller of the vehicle from manual to autonomous mode.

In the method, propulsion of the machine may be deactivated by an interlock circuit during a transitioning period in which the first selector switch is switched to autonomous mode and the second selector switch is switched to manual mode.

The interlock circuit may be controlled by the first and second selector switch.

In an embodiment, the method may comprise further steps or features:

Step S1 of operating the vehicle in manual mode and step S2 of switching the first selector switch from manual mode to autonomous mode may be performed in a cabin of the vehicle.

The method may comprise a sub-step S2.1 of leaving the cabin performed after step S2. Step S3 of switching the second selector switch from manual mode to autonomous mode may be performed while standing on the ground next to the vehicle.

In an embodiment, in a further step, performed after step S3 of switching the second selector switch from manual mode to autonomous mode, a driver may move away from the vehicle.

In an embodiment, in a further step, the driver may deactivate the interlock circuit with a remote control. This step may be performed after the step of moving away from the vehicle.

In an embodiment of the method, the driver may activate the interlock circuit with the remote control at any point in time before switching the second selector switch from manual mode to autonomous mode in step S3.

FIG. 5 shows a second embodiment of a method. The second embodiment may be combined with the first embodiment. The method according to the second embodiment may comprise the following steps:

In step S4, the vehicle may be operated in manual mode. A first selector switch may be switched to manual mode and a second selector switch may be switched to manual mode. This step may correspond to step S1 of the first embodiment.

In step S5, the first selector switch may be switched from manual mode to autonomous mode. Thereby, a first stage of an interlock circuit deactivating propulsion of the machine may be activated. In an embodiment, the first stage of the interlock circuit may be activated by the first selector switch cutting off power to the interlock circuit. This step may correspond to step S2 of the first embodiment In an embodiment of the method, the driver may activate a second stage of the interlock circuit with the remote control in step S6. Alternatively or in addition, the second stage may be automatically activated by switching the first selector switch to autonomous mode in step S5.

Step S4 of operating the vehicle in manual mode and step S5 of switching the first selector switch from manual mode to autonomous mode may be performed in a cabin of the vehicle. The method may therefore comprise step S7 of leaving the cabin. This step may correspond to step S2.1 of the first embodiment.

In step S8, the second selector switch may be switched from manual mode to autonomous mode. Thereby, the first stage of an interlock circuit may be deactivated. In an embodiment, the first stage of the interlock circuit may be deactivated by the first and the second selector switch being in a switching state for providing power to the interlock circuit. Power may still be cut off from the interlock circuit by the second stage. This step may correspond to step S3 of the first embodiment.

In step S9, performed after step S5 of switching the second selector switch from manual mode to autonomous mode, a driver may move away from the vehicle.

In step S10, the driver may activate propulsion of the machine by deactivating the interlock circuit with a remote control. This may in particular involve switching on power to the interlock circuit by deactivating the second stage. In an embodiment, this may in particular involve deactivating the second stage of the interlock circuit by the remote control.

Step S6 may be performed at any point in time before switching the second selector switch from manual mode to autonomous mode in step S8.

Step S8 of switching the second selector switch from manual mode to autonomous mode may be performed while standing on the ground next to the vehicle.

The methods may further comprise steps for transitioning from autonomous mode to manual mode. The same steps as described above can be performed for this purpose in the reverse order.

The methods may be performed with at least one out of a vehicle as described with respect to FIG. 1, a vehicle control system as described with respect to FIG. 2, and a vehicle propulsion and safety system as described with respect to FIG. 3.

In an embodiment, the interlock circuits as described herein can provide an emergency stop functionality to the vehicle. In an embodiment, the interlock circuit is configured as an emergency stop.

In summary, the present application provides, as an additional safety feature, a concept of de-energizing the electric drive system with a high safety integrity level. This is to ensure de-energizing of the machine's motive power source without the use of a computing device or software. This may be accomplished by a circuit with relays that remove the power to the exciter of the traction alternator. Without excitation it is impossible for the machine to generate propulsion power. This prevents unintended propulsion of said machine.

A first use case involves a safe transition from manned to autonomous operation (and vice-versa) where the safety feature can ensure with a high safety integrity level no propulsion of the machine.

A second use case involves the possibility that a system malfunction results in the run away of an autonomous vehicle. The circuit for this application includes connection to an E-stop device where an E-stop signal from a remote observer can remotely engage the excitation disconnect and remove propulsion power from a machine.

The invention claimed is:

1. A vehicle comprising:
an internal combustion engine,
an alternator driven by the internal combustion engine for generating electrical energy, the alternator comprising an exciter,
an electrical drive powered by the electrical energy generated by the alternator, the electrical drive configured to propel the vehicle,
a safety system comprising an interlock circuit, the interlock circuit being configured to cut off power to the exciter, and
a vehicle control system, the vehicle control system being configured to operate the vehicle in an autonomous mode and in a manual mode, the vehicle control system comprising:
a first selector switch for switching between the autonomous mode and the manual mode; and
a second selector switch for switching between the autonomous mode and the manual mode; and
wherein the interlock circuit is configured to deactivate propulsion of the vehicle via the electrical drive by cutting off the power to the exciter when the first and the second selector switch are switched to different modes.

2. The vehicle of claim 1, further comprising
a cabin for a driver, the cabin comprising input elements for controlling the vehicle in the manual mode,
wherein the first selector switch is located in the cabin and the second selector switch is located outside the cabin on the vehicle, and
wherein the second selector switch is located in an area of the vehicle accessible by a person standing next to the vehicle on the ground but not accessible from the cabin.

3. The vehicle of claim 1, further comprising
a cabin for a driver, the cabin comprising input elements for controlling the vehicle in manual mode, and
at least one out of a ladder and stairs for climbing up to the cabin,
wherein the first selector switch is located in a first area that is accessible by climbing the at least one out of the ladder and stairs and the second selector switch being located in a second area accessible by descending the at least one out of the ladder and stairs.

4. The vehicle of claim 1, wherein the interlock circuit comprises a first relay configured to deactivate propulsion of the vehicle when a control port of the first relay is not powered, wherein the first and the second selector switch are configured to control power to the control port of the first relay, wherein the first and the second selector switch are connected in series to power the control port of the first relay when switched to a same mode, and configured to cut power to the control port of the first relay when switched to different modes.

5. The vehicle of claim 4, wherein the interlock circuit comprises a second relay, arranged in series with the first relay, such that the first and the second relay deactivate propulsion of the vehicle independently from each other, the second relay being controlled by a microprocessor of the vehicle control system wherein the microprocessor includes memory and instructions.

6. The vehicle of claim 4, further comprising a third switch for deactivating propulsion of the vehicle, the third switch being connected in series with the first and the second selector switch such that the third switch is configured to cut power to the control port of the first relay independently from the first and second selector switches.

7. The vehicle of claim 6, further comprising a park brake, wherein the vehicle control system is configured such that the park brake cannot be released if the third switch deactivates propulsion of the vehicle.

8. The vehicle of claim 1, further comprising a remote control configured to remotely control a second stage of the interlock circuit.

9. The vehicle of claim 8, wherein the second stage of the interlock circuit comprises a third relay arranged in a first electrical line powering a control port of a first relay, the third relay being controlled by the remote control.

10. The vehicle of claim 1, wherein the interlock circuit comprises a first relay, the first relay being configured to cut off power to the exciter, wherein the first and the second selector switch are configured to control power to a control port of the first relay, wherein the first and the second selector switch are connected in series to power the control port of the first relay when switched to a same mode, and configured to cut off power to the control port of the first relay when switched to different modes.

11. The vehicle of claim 10, wherein the first relay is configured to cut off power to the exciter if the control port of the first relay is not powered.

12. The vehicle of claim 1, the interlock circuit comprising a first relay arranged in a first electrical line powering the exciter, wherein the first relay is configured to cut off power to the exciter if a control port of the first relay is not powered.

13. The vehicle of claim 12, comprising a remote control configured to remotely control power to the control port of the first relay.

14. The vehicle of claim 12, comprising at least one switch arranged in in a second electrical line powering the control port of the first relay, wherein the at least one switch is operable manually to cut off power to the control port.

15. A vehicle comprising:
an internal combustion engine,
an alternator driven by the internal combustion engine for generating electrical energy, the alternator comprising an exciter,
an electrical drive powered by the electrical energy generated by the alternator, the electrical drive configured to propel the vehicle, and
a safety system comprising an interlock circuit, the interlock circuit being configured to cut off power to the exciter,
the interlock circuit comprising a first relay arranged in a first electrical line powering the exciter, wherein the first relay is configured to cut off power to the exciter if a control port of the first relay is not powered,
wherein the vehicle further comprises at least one out of:
a remote control configured to remotely control power to the control port of the first relay, and
at least one switch arranged in a second electrical line powering the control port of the first relay, wherein the at least one switch is operable manually to cut off power to the control port.

16. The vehicle of claim 15, further comprising:
a service brake, wherein the safety system is configured to engage the service brake when the interlock circuit is activated.

17. The vehicle of claim 15, wherein the interlock circuit is configured as an emergency stop.

18. A vehicle comprising:
an internal combustion engine,
an alternator driven by the internal combustion engine for generating electrical energy, the alternator comprising an exciter,
an electrical drive powered by the electrical energy generated by the alternator, the electrical drive configured to propel the vehicle,
a safety system comprising an interlock circuit, the interlock circuit being configured to cut off power to the exciter, and
the vehicle further comprising at least one out of:
an electrical retarder coupled to the electrical drive for operating the electrical drive in a braking mode, the electrical retarder configured to stay connected to the electrical drive when the interlock circuit is activated, and
a service brake, wherein the safety system is configured to engage the service brake when the interlock circuit is activated.

19. The vehicle of claim 18, wherein the interlock circuit is configured as an emergency stop.

20. A method for transitioning between a manual mode and an autonomous mode for controlling a vehicle with an internal combustion engine, wherein the vehicle comprises an alternator driven by the internal combustion engine for generating electrical energy, the alternator comprising an exciter, the method comprising:
operating the vehicle in manual mode with a first selector switch switched to manual mode and a second selector switch switched to manual mode;
switching the first selector switch from manual mode to autonomous mode;
switching the second selector switch from manual mode to autonomous mode,
wherein propulsion of the vehicle via an electrical drive powered by the electrical energy generated by the alternator is deactivated by an interlock circuit during a transitioning period in which the first selector switch is switched to autonomous mode and the second selector switch is switched to manual mode by cutting off power to the exciter.

21. The method of claim 20, further comprising a step of deactivating the interlock circuit with a remote control.

22. The method of claim 20, wherein the steps of operating the vehicle in manual mode and switching the first selector switch from manual mode to autonomous mode are performed in a cabin of the vehicle, wherein the step of switching the second selector switch from manual mode to autonomous mode is performed while standing on the ground next to the vehicle.

* * * * *